United States Patent [19]

Faroudja et al.

[11] Patent Number: 5,291,280
[45] Date of Patent: Mar. 1, 1994

[54] MOTION DETECTION BETWEEN EVEN AND ODD FIELDS WITHIN 2:1 INTERLACED TELEVISION STANDARD

[76] Inventors: Yves C. Faroudja, 26595 Anacapa Dr., Los Altos Hills, Calif. 94022; Dong Xu, 1650 Beck Dr., San Jose, Calif. 95130; Peter Swartz, 643 Wakerobin La., San Rafael, Calif. 94903

[21] Appl. No.: 878,725

[22] Filed: May 5, 1992

[51] Int. Cl.$^5$ ............................................. H04N 7/13
[52] U.S. Cl. ...................................... 348/416; 348/447
[58] Field of Search ................... 358/105, 136, 140, 54, 358/97, 214, 216

[56] References Cited

U.S. PATENT DOCUMENTS

| | | | |
|---|---|---|---|
| 4,768,092 | 8/1988 | Ishikawa | 358/105 |
| 4,976,271 | 10/1990 | Campbell | 358/105 |
| 4,982,280 | 1/1991 | Lyon | 358/105 |

*Primary Examiner*—Tommy P. Chin
*Assistant Examiner*—Bryan S. Tung

*Attorney, Agent, or Firm*—Thomas A. Gallagher; David N. Lathrop

[57] ABSTRACT

A motion detector generates a field motion detection signal from information contained in adjacent fields of a two-to-one interlaced format video signal. The motion detector comprises an input for receiving the video signal from a source, a first delay for delaying the video signal at the input by one field period less one half of one scanning line period and for providing a first delayed output, a second delay for delaying the video signal at the input by one field period plus one half of one scanning line period and for providing a second delayed output, a first subtraction circuit for subtracting the first delayed output from the video signal to provide a first difference, a second subtraction circuit for subtracting the second delayed output from the video signal to provide a second difference, and a comparison circuit for comparing the first difference with the second difference and for putting out a selected one thereof having a lesser absolute magnitude as the field motion detection signal. A film mode sequence pattern interruption detector using the motion detector is also disclosed.

21 Claims, 7 Drawing Sheets

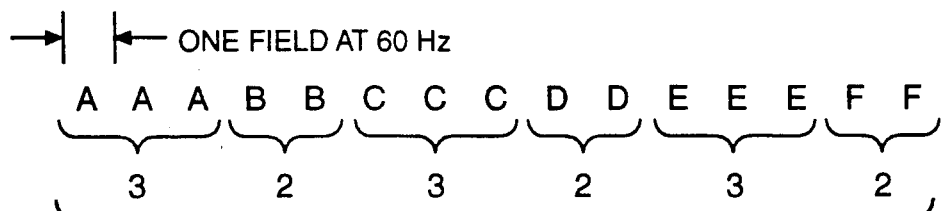
FIG._1
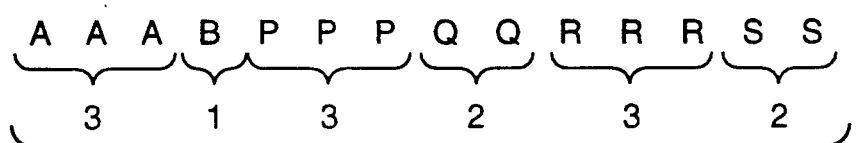
FIG._2
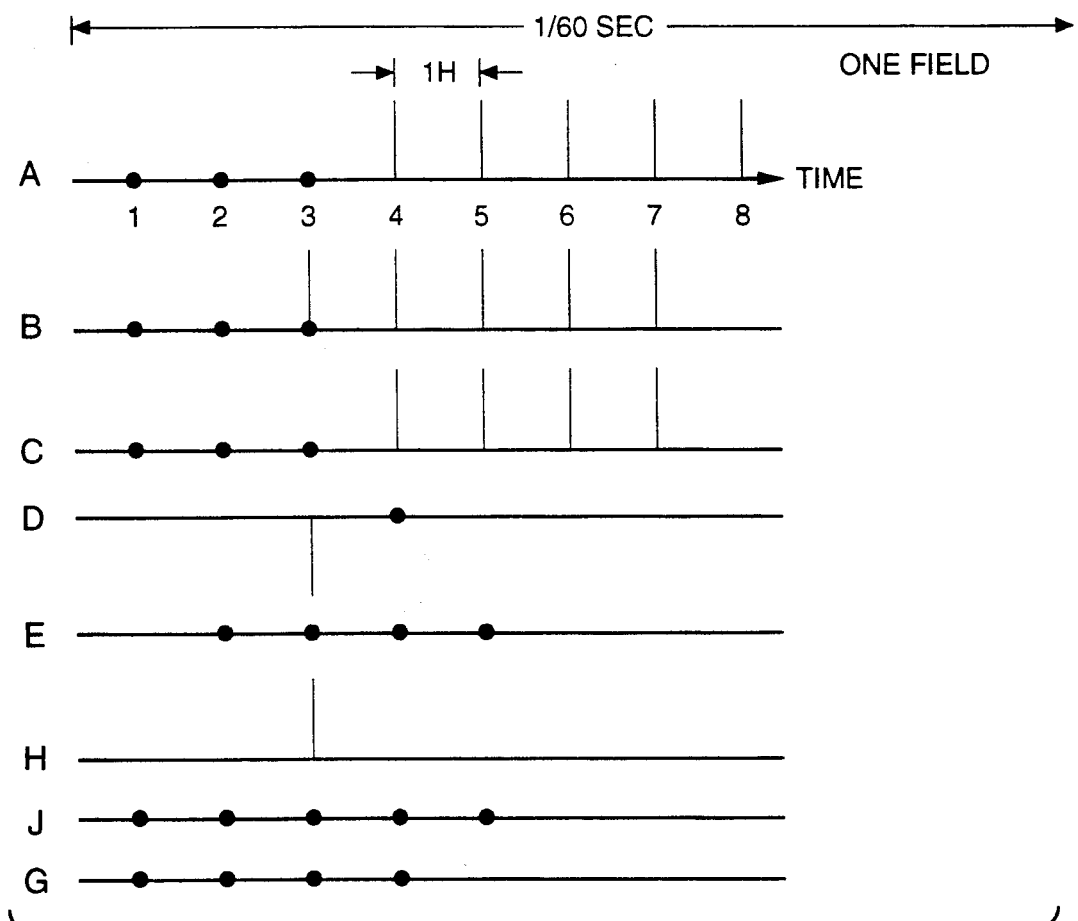
FIG._4

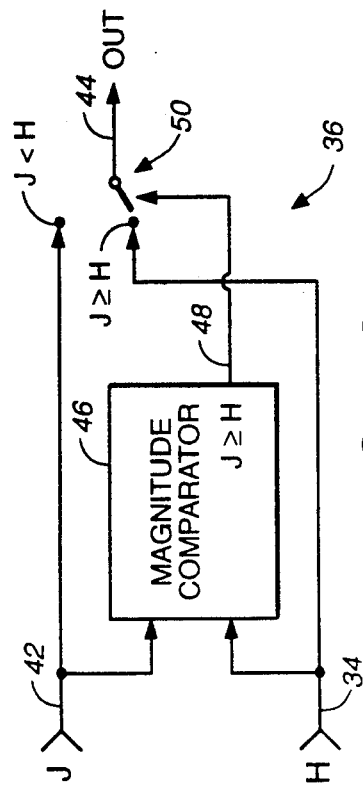
FIG._3A
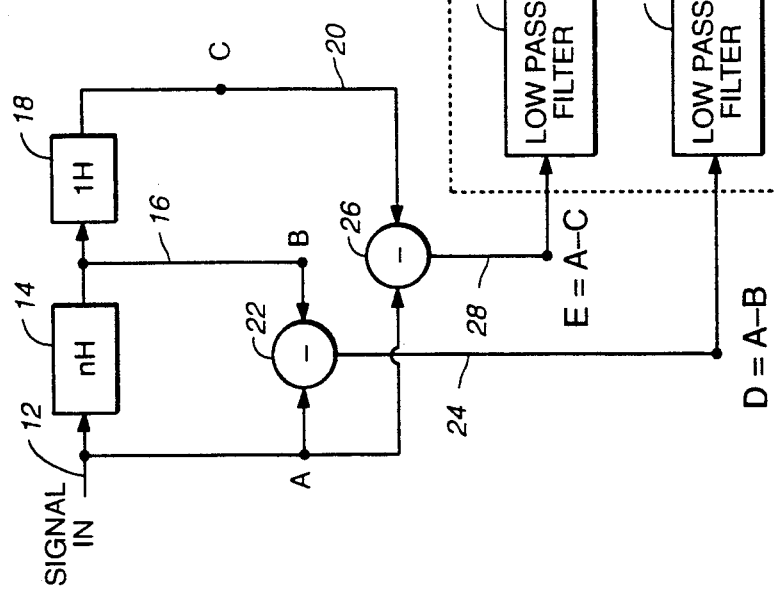
FIG._3

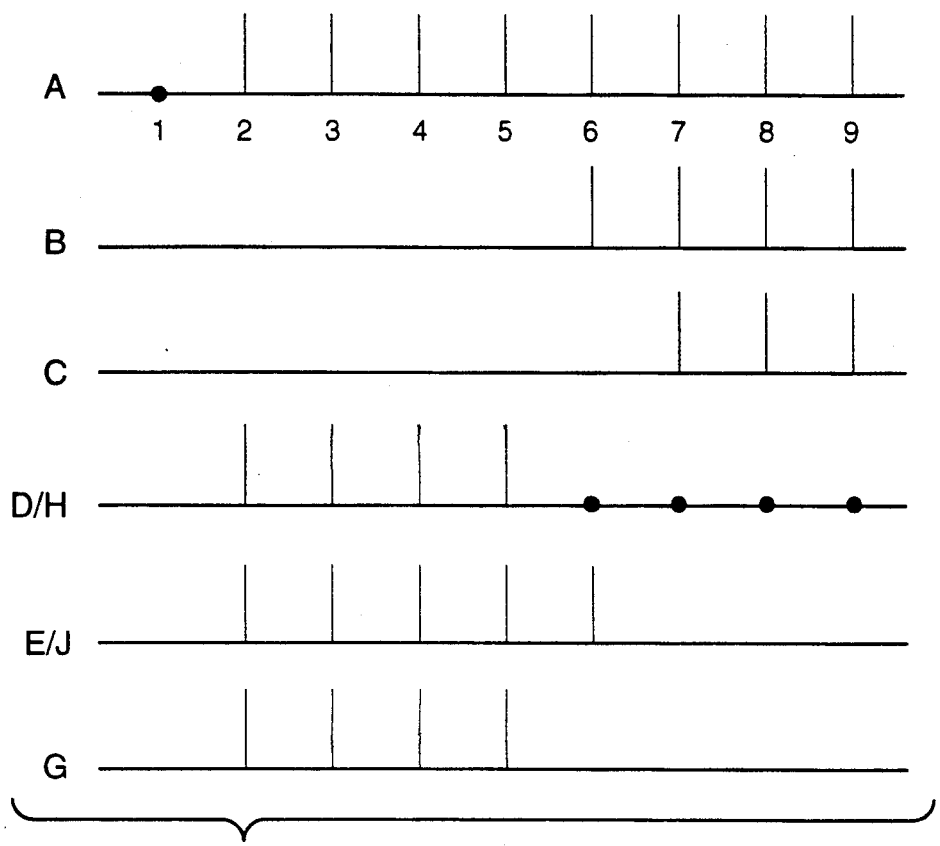
FIG._5
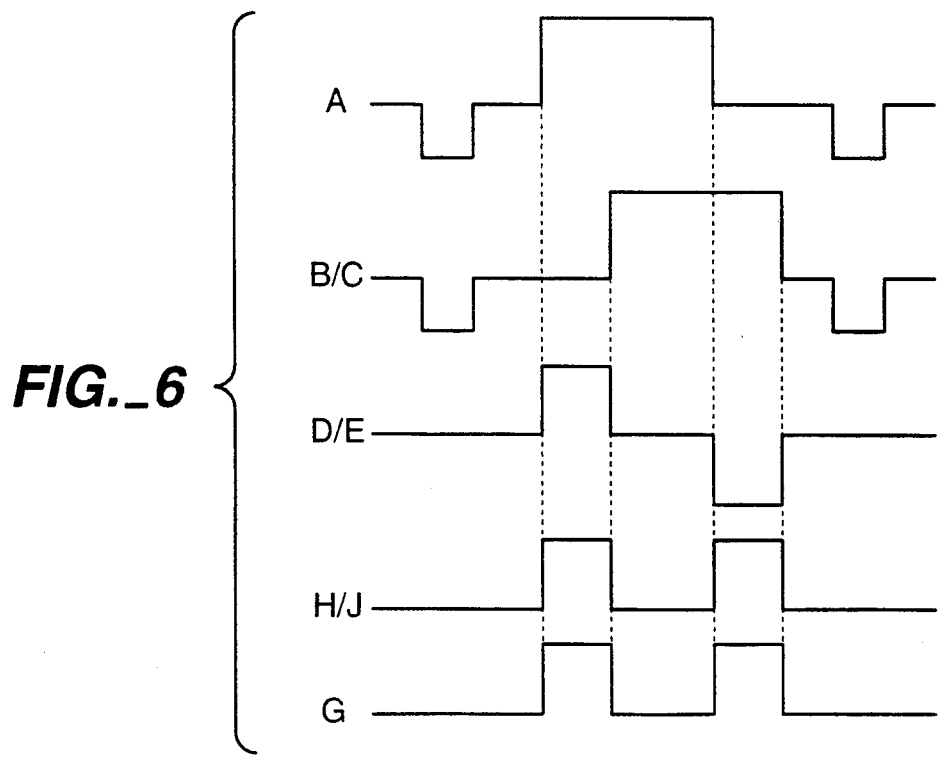
FIG._6

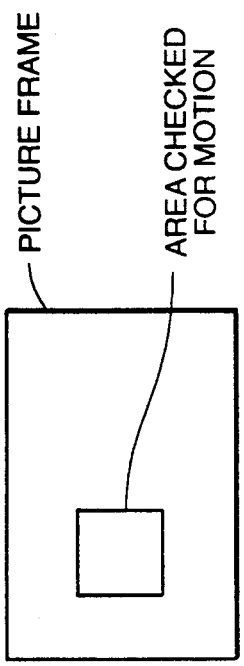
FIG._9
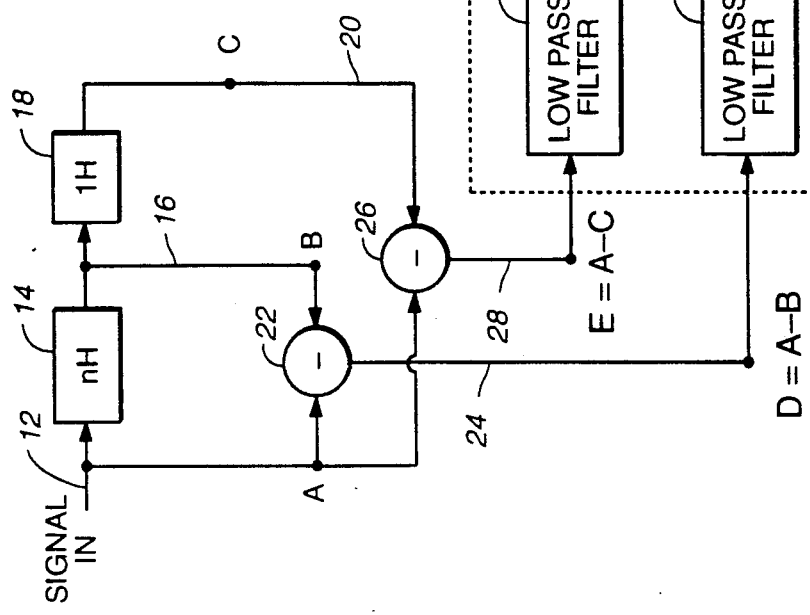
FIG._7

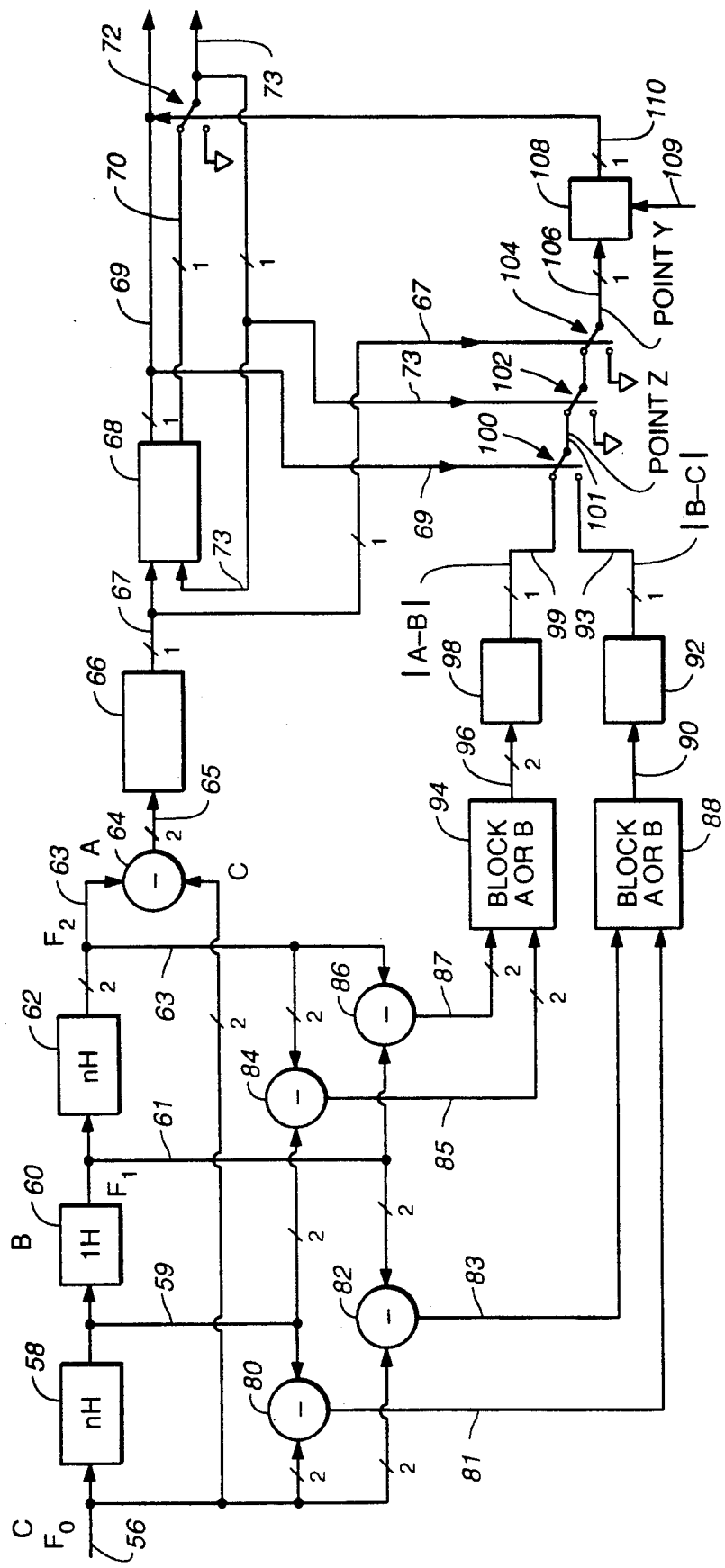
FIG._8

| SIGNAL 56 | F0 | A | A | A | B | P | P | P | Q | Q | R | R | R |
|---|---|---|---|---|---|---|---|---|---|---|---|---|---|
| SIGNAL 59,61 | F1 | A | A | A | B | P | P | P | Q | Q | R | R | R |
| SIGNAL 63 | F2 | | A | A | A | B | P | P | P | Q | Q | R | R | R |
| SIGNAL 67 | FRAME MOTION | | 0 | 1 | 1 | 1 | 0 | 1 | 1 | 1 | 1 | 0 |
| SIGNAL 69 | F0/F2 | | 0 | 2 | 0 | 2 | 0 | 0 | • | • | • | • |
| SIGNAL 70 | FILM Y/N | | Y | Y | Y | N | N | N | N | N | N | Y |
| SIGNAL 99 | \|A–B\| | | 0 | 0 | 1 | 1 | 0 | 0 | 1 | 0 | 1 | 0 |
| SIGNAL 93 | \|B–C\| | | 0 | 1 | 1 | 0 | 0 | 1 | 0 | 1 | 0 | 0 |
| SIGNAL 106 | POINT Y | | 0 | 0 | 1 | • | • | • | • | • | • | • |
| SIGNAL 110 | BAD EDIT Y/N | | N | N | Y | • | • | • | • | • | • | • |
| SIGNAL 73 | FILM Y/N | | Y | Y | N | N | N | N | N | N | N | Y |
FIG._10
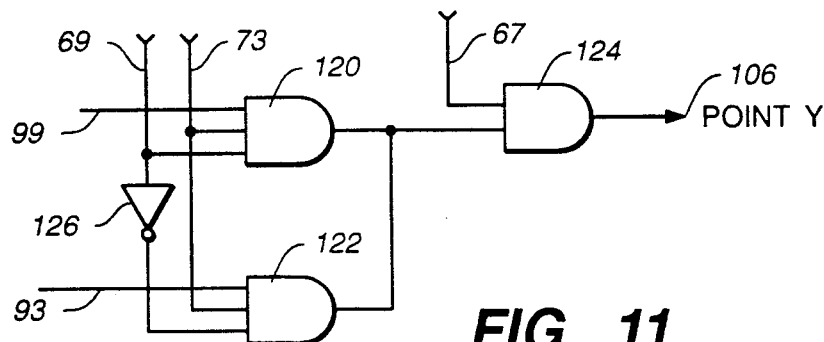
FIG._11
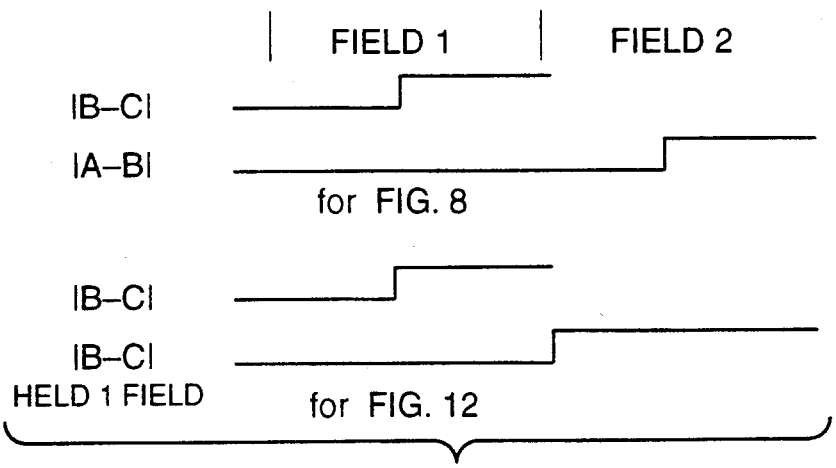
FIG._13

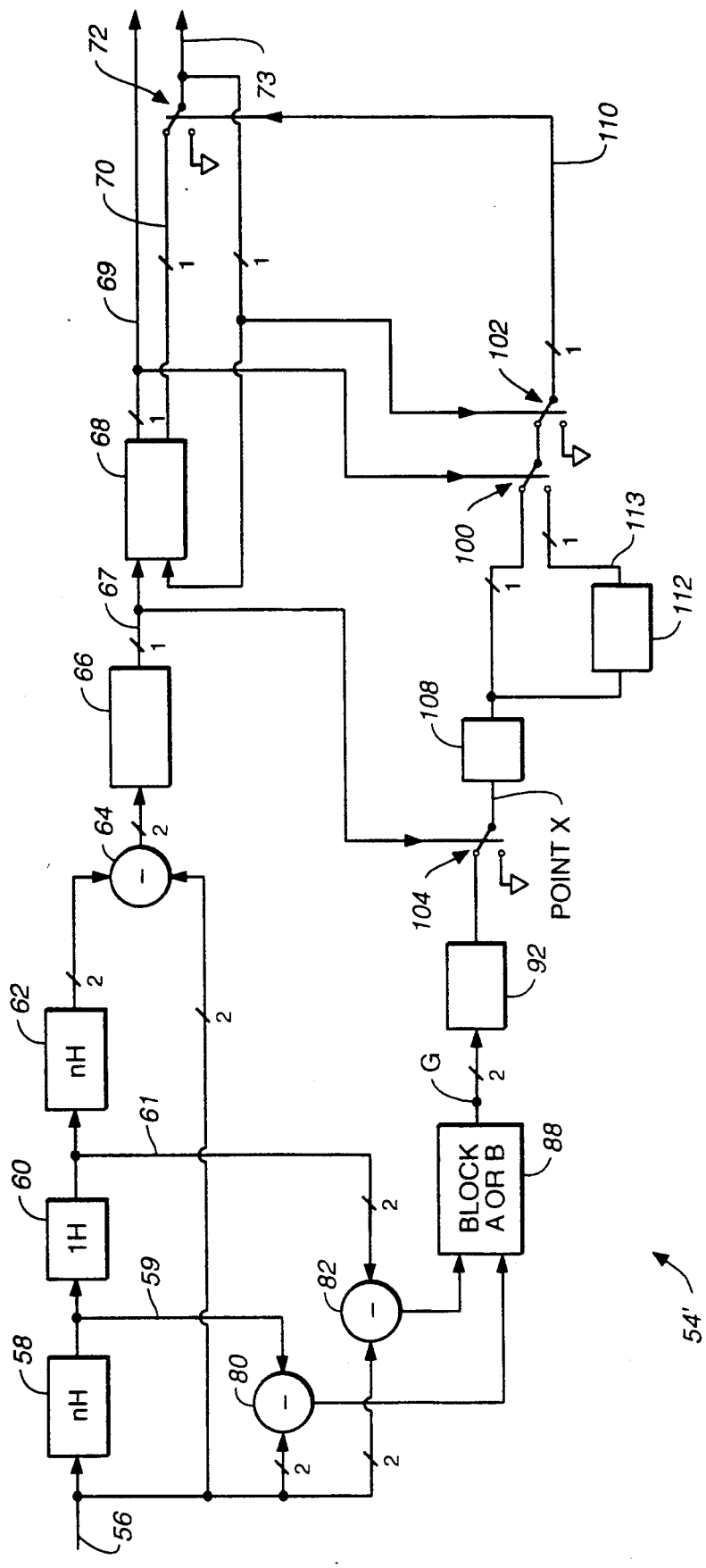
FIG._12

MOTION DETECTION BETWEEN EVEN AND ODD FIELDS WITHIN 2:1 INTERLACED TELEVISION STANDARD

FIELD OF THE INVENTION

The present invention relates to television signal processing methods and apparatus. More particularly, the present invention relates to methods and apparatus for detecting images in motion between even and odd fields within a two to one interlaced television picture format.

BACKGROUND OF THE INVENTION

It is known to detect motion between fields of identical parity in a two-to-one interlaced television standard, as between successive even fields, or between successive odd fields. In detecting images in motion, information from a first frame is subtracted from information from a second frame which is spatially aligned with the information from a first frame. When the result of this subtraction is zero, no motion is deemed to be present. When there is a difference, motion is deemed to be present. The present inventor and others have developed a frame-by-frame based motion detector which is disclosed in commonly assigned U.S. Pat. No. 4,967,271 in conjunction with FIGS. 3, 4 and 5 thereof, the disclosure of which being hereby incorporated by reference.

In the case of a two-to-one interlaced television signal standard, such as NTSC or PAL, the foregoing motion detection process does not work on a field-by-field basis because, even in the case of static picture content, the interlace process provides different information between even and odd field scan lines. For example, a conventional television frame at e.g. a 30 Hz repetition rate in the case of the NTSC standard is composed of two 60 Hz fields, e.g. F0 and F1. Each field includes 262.5 scan lines. Each scanning line of an odd or even field is separated by an unilluminated strip or band. Successive fields are offset by one-half line, so that the scan lines of the next field (e.g. even field) occupy the unilluminated strips of the present field (e.g. odd field). This interlaced picture standard has been followed to minimize perception of 30 Hz flicker in the resultant picture display.

If spatially aligned information between adjacent odd and even fields are subtracted, a difference will result for every instance of a vertical transition as well as for a motion condition. Consequently, motion detection systems following the prior art approach do not work on a field by field basis within a two-to-one interlaced standard.

While the prior motion detection methods and approaches work for some television signal processing applications, there are a number of emerging applications and uses which require detection of motion within the interlaced frame, rather than on a frame-by-frame basis. One example is in the case of multi-dimensional signal processing of video such as line doubling wherein information from adjacent fields is being interpolated into new information for the doubled line picture. Another example is the conversion of one television picture signal in a first standards format such as NTSC into a signal following a second standards format having a different line scan rate such as PAL. A further emerging application is in the field of digital processing, special effects, and like applications requiring motion compensation.

One other important example is within a process for detecting whether a video source originated with film or with a television camera viewing a live picture source, for example. One example of such a process is disclosed in commonly assigned U.S. Pat. No. 4,982,280 entitled "Motion Sequence Pattern Detector for Video", the disclosure of which being hereby incorporated by reference. In this prior approach a sequence of picture images is analyzed to determine the presence of three-to-two pull down ratio which is characteristic of a film-to-video source of the video information. An exemplary sequence is illustrated in FIG. 1 which shows the repetition of film frames A, B, C, D, E, F, etc., on a three-to-two pull down ratio basis. By detecting the three-to-two pull down sequence as shown in FIG. 1, line doubling based on a field by field basis became entirely practical.

A hitherto unsolved need has arisen to detect film sequences in other standards, such as a 625 line, 50 Hz format standards (e.g. PAL). In the PAL format the field rate is 50 fields per second, and a film sequence (originally filmed at 24 frames per second) is speeded up for playback at 25 frames per second. For this reason, there is no pull down ratio in the PAL format, and for this reason one cannot detect film sequences in PAL with frame motion circuitry. Also, in the PAL format each film frame occupies an odd field and an even field, with the next odd and even fields carrying the next film frame. Thus, a hitherto unsolved need has arisen for a motion detection method and apparatus which is capable of detecting motion between successive fields of opposite polarity.

Also, the need to detect motion on a field by field basis has arisen in the NTSC standards format when film has been transferred to video format and then subjected to electronic editing. In those instances of film to video transfer and subsequent video edit, the three-to-two pull down ratio is frequently disturbed by an editing splice between fields which are inconsistent with the film pull down ratio. This situation is illustrated in FIG. 2 wherein the three-to-two pull down arrangement of film frames to video fields is shown to have an edit point and resultant pull down ratio discontinuity between film frames B and P. The line doubler described in the referenced prior U.S. Pat. No. 4,982,280 could remain in film mode for e.g. up to five fields, with the undesirable result of creating an objectionable line pattern in the resultant video display immediately following the edit point. In order to correct this situation, it becomes important to detect differences of information between even and odd fields.

Also, extremely complex systems and methods are being proposed to preserve the integrity of a video image when standards conversion is performed on film-originated subject matter. One approach known in the prior art is to provide e.g. 24 frame memories which is very expensive. There is something unnecessarily complicated in processes which begin at an original image rate of 24 images per second, which become processed at a field rate of 60 (or 50) fields per second, and then revert to 24 (or 25) images per second. It is therefore important to know if the original subject matter was film and to detect that fact; and further, when there is a discontinuity attributable to electronic editing, to detect that fact and immediately compensate for it. This need exists whether the conversion is from a 60 Hz to 50 Hz standard, or vice-versa.

The need to detect motion on a field-by-field basis also arises in the context of systems which change the time scale. Many contemporary video recorder/playback units provide an option to play back the images at an accelerated rate of 1.5 to 2 times the original speed. In these processes the resultant picture images may be improved upon by detection of motion on a field-by-field basis.

Another need for detection of motion between adjacent interlaced fields has arisen in conjunction with digital encoding and decoding of video information for data compression, particularly in the field of high definition television (HDTV). In such applications, it is useful to modify the coefficient algorithm coefficients whenever film sequences are present. Detection of film sequences, and irregular edit points, has thus arisen as a hitherto unsolved need.

Thus, from the foregoing the reader will appreciate that a hitherto unsolved need has arisen for a method and system to detect motion on a field-by-field basis from an interlaced video source (irrespective of the fact that the signal may be progressively displayed or transmitted).

SUMMARY OF THE INVENTION

A general object of the present invention is to provide a method and apparatus for detecting images in motion between even and odd fields within a two-to-one interlaced television signal in a manner overcoming limitations and drawbacks of the prior art.

A more specific object of the invention is to provide a field motion detector for use within a two-to-one interlaced temporal video signal stream in conjunction with a frame motion detector operating upon the same signal stream, in order to identify motion on a field by field basis.

A further specific object of the present invention is to provide a pattern interruption detector for controlling a pattern recognition circuit within a temporal video signal stream.

As one facet of the present invention, a motion detector generates a field motion detection signal from information contained in adjacent fields of a two-to-one interlaced format video signal. The motion detector comprises an input for receiving the video signal from a source, a first or field delay for delaying the video signal at the input by one field period less one half of one scanning line period and for providing a first delayed output, a second or line delay for delaying the video signal at the input by one field period plus one half of one scanning line and for providing a second delayed output, a first subtraction circuit for subtracting the first delayed output from the video signal to provide a first difference, a second subtraction circuit for subtracting the second delayed output from the video signal to provide a second difference, and a comparison circuit for comparing the first difference with the second difference and for putting out a selected one thereof having a lesser absolute magnitude as the field motion detection signal.

As one aspect of this facet of the invention, a first low pass filter, a first sign removal circuit and a first threshold circuit are in a path between the first subtraction circuit and the comparison circuit, and a second low pass filter circuit, a second sign removal circuit and a second threshold circuit are in a path between the second subtraction circuit and the comparison circuit.

As another aspect of this facet of the invention, a second field delay is connected to receive the second delayed output and puts out a frame delayed output, and a third subtraction circuit is provided for subtracting the frame delayed output from the video signal to generate a frame motion detection signal.

As a further aspect of this facet of the invention, a logic circuit is provided for combining said field motion detection signal and said frame motion detection signal to provide a composite motion detection signal for signalling detection of motion occurring within a particular field of the frame.

As another facet of the present invention, a pattern interruption detector is provided for controlling operation of a motion sequence pattern detector for detecting a periodic pattern of motion sequences within a video temporal signal stream from a source and including a frame motion detector for detecting the presence of motion by comparing spatial picture data to similarly located, frame delayed successive spatial picture data within the video temporal signal and for putting out a frame motion detection signal for each comparison of said data and a first logic circuit responsive to a sequence of frame motion detection signals for detecting said periodic pattern of motion sequences within the video temporal signal stream and for putting out a pattern detection control signal. The pattern interruption detector comprises an input for receiving the temporal video signal stream from the source, a field delay for delaying the video signal at the input by one field period less one half of one scanning line period and for providing a first delayed output, a line delay for delaying the first delayed output by a period of one scanning line and for providing a second delayed output, a first subtraction circuit for subtracting the first delayed output from the video signal to provide a first difference, a second subtraction circuit for subtracting the second delayed output from the video signal to provide a second difference, a first comparison circuit for comparing the first difference with the second difference and for putting out a selected one thereof having a lesser absolute magnitude as a field motion detection signal, and a second logic circuit connected to said frame motion detector, to said comparison circuit and to said first logic circuit for detecting an interruption in the periodic pattern and for thereupon generating an inhibition control signal for inhibiting said first logic circuit.

These and other objects, advantages, aspects and features of the present invention will be more fully understood and appreciated upon consideration of the following detailed description of preferred embodiments, presented in conjunction with the accompanying drawings.

BRIEF DESCRIPTION OF THE DRAWINGS

In the Drawings:

FIG. 1 is a graph showing a sequence of two-to-one interlaced video fields which have originated from film frames displayed at a three-to-two pull down ratio relative to the video fields.

FIG. 2 is a graph illustrating a discontinuity in pull down ratio of the FIG. 1 film-video sequence, resulting e.g. from an electronic edit point.

FIG. 3 is a block diagram of a field motion detector in accordance with principles and aspects of the present invention.

FIG. 3A is a block diagram of a circuit for keeping the smaller value of two incoming values as employed within the FIG. 3 field motion detector.

FIG. 4 is a series of graphs illustrating operation of the FIG. 3 field motion detector in the instance of a static vertical transition.

FIG. 5 is a series of graphs illustrating operation of the FIG. 3 field motion detector in the instance of an image having vertical domain motion.

FIG. 6 is a series of graphs illustrating operation of the FIG. 3 field motion detector in the instance of an image having horizontal domain motion.

FIG. 7 is a block diagram of an alternative embodiment of the field motion detector in accordance with principles and aspects of the present invention.

FIG. 8 is a block diagram of a film sequence edit point detector and corrector employing principles and aspects of the present invention.

FIG. 9 is a graph of a television picture display showing a motion detection zone that is under observation for moving objects.

FIG. 10 is a logic table illustrating operation of the FIG. 8 detector.

FIG. 11 is a logic circuit equivalent of a switch array within the FIG. 8 film sequence edit point detector and corrector.

FIG. 12 is a block diagram of an alternative simplified embodiment of a film sequence edit point detector and corrector also embodying principles and aspects of the present invention.

FIG. 13 is a of waveforms illustrating operation of the detectors shown in FIG. 8 and FIG. 12.

DETAILED DESCRIPTION OF PREFERRED EMBODIMENTS

Turning now to FIG. 3, a field motion detector 10 incorporates principles and aspects of the present invention. The detector 10 includes an input 12 for receiving a stream of two-to-one interlaced television fields. The incoming stream on the path 12 is subjected to a delay 14. The delay 14 corresponds to the duration of one field minus the duration of one half scanning line. In the case of the NTSC standards format, the delay 14 corresponds to 262 line scan periods. A delayed output is provided on a path 16 to a single scan line delay 18. An output from the single scan line delay 18 is provided on a path 20.

The field delayed video on the path 16 is subtracted from the incoming undelayed video on the path 12 in a first subtraction circuit 22 which puts out a difference over a path 24. The field and line delayed video on the path 20 is subtracted from the incoming video on the path 12 in a second subtraction circuit 26 which puts out a difference over a path 28.

The difference signal on the path 24 is passed through a low pass filter 30 and a full wave rectifier 32 to provide a processed signal on a path 34 which enters a "keep smaller value" circuit 36. Similarly, the difference signal on the path 28 is passed through a low pass filter 38 and full wave rectifier 40 to provide a processed signal on a path 42 which also enters the keep smaller value circuit 36. The low pass filters 30 and 38 provide a notch at a color subcarrier frequency, and in the example of the NTSC standards format, the filters 30 and 38 have a 3 dB rolloff at approximately 1.2 MHz. The elements 30, 32, 36, 38 and 40 in FIG. 3 have been enclosed within a box labelled "Block B" for reasons which will be explained hereinafter in conjunction with FIGS. 8 and 12.

In order to prevent unwanted triggering of the detector 10 by noise and other low level artifact in the picture signal, a circuit, threshold 31 and threshold 41, respectively, providing a threshold function is implemented, preferably immediately following the full wave rectifiers 32 and 40. The threshold circuit could also be inserted after the keep smaller value circuit 36. In any event, the threshold circuit provides a threshold which is adjusted to be slightly above the noise and low level artifact magnitudes expected to be found in the incoming video signal stream.

One preferred implementation of the keep smaller value circuit 36 is shown in FIG. 3A. A magnitude comparator 46 compares the magnitude of incoming signals H and J respectively present on paths 34 and 42. The magnitude comparator 46 determines if J is greater than or equal to H, and if so generates and puts out a control signal on a path 48 to control operation of a switch 50. The switch 50 puts out J when it is of lesser magnitude than H. When J is equal to or greater in magnitude than H, the switch 50 is operated, and the H signal is then put out.

In operation the detector circuit 10 separates vertical transitions from images in motion within the incoming video signal stream. The concept implemented within the FIG. 3 detector circuit lo is to compare two adjacent fields, but not on a line by line basis. Rather, three lines of information are compared. A first comparison, provided by the subtracter 22 is between a present line, and a prior line occurring temporally nearly one field earlier (262 scan lines earlier in the NTSC signal format). This earlier line is spatially about one half line above the present scan line on the display. A second comparison, provided by the subtracter 26 is between the present scanning line and a prior line occurring temporarily just over one field earlier (263 scanning lines earlier in the NTSC signal format). This second earlier scan line is spatially about one half line below the present scan line on the display and lies in the same field as the other earlier scan line. For simplicity of further discussion, the incoming scan line is denoted A, the first earlier scan line is denoted B, and the second earlier scan line is denoted C. The difference put out from the subtracter 22 is denoted D, and the difference put out from the subtracter 26 is denoted E. The processed, threshold-passed passed signal on the path 34 is denoted H, and the processed, threshold-passed signal on the path 42 is labelled J. The signal put out from the keep smaller value circuit 36 on the path 44 is denoted G.

The FIG. 4 graphs illustrate graphically that the detector 10 will not signal detection of motion for a picture sequence which includes a static vertical transition. Each graph corresponds to the alphabetic signal identifier shown in FIG. 3. Graph A of FIG. 4 illustrates a vertical black to white level transition occurring between scan lines 3 and 4 in the present field in the input signal A. Graph B illustrates the same vertical transition in the previous field in the immediately preceding scan line, signal B. Graph C illustrates the same vertical transition in the previous field in the immediately following scan line, signal C. Graph D represents a difference resulting from the A minus B comparison provided by the subtracter 22. Graph E represents a difference resulting from the A minus C comparison provided by the subtracter 26. Graph H represents inversion of the difference D resulting from operation of the full wave rectifier 32. Graph G depicts the selection of the "lesser value", in this case signal E/J. Thus, for a vertical domain static transition, the output G from the motion detector 10 on the path 44 is zero.

FIG. 5 illustrates operation of the FIG. 3 detector 10 in the presence of an object in the incoming picture signal which is in motion at a velocity exceeding one half line per field. In this example, the incoming signal A indicates a vertical black-to-white level transition occurring between scan lines 1 and 2. The spatially adjacent scan lines B and C in the prior field indicate the same level transition respectively occurring at scan lines 6 and 7. This illustration thus presents a commonly occurring picture condition wherein the object in motion is moving from the bottom to the top of the screen at a rate of about 5 scan lines per field, which takes about 4/5ths of a second. Since FIG. 3A specifies that H is selected and put out as the value G when J is greater than or equal to H, in the present example the difference value D/H is selected and put out for scan lines 1 through 6. The keep smaller value circuit 36 thus selects and puts out the D/H value as a motion detection value. From a comparison of FIGS. 4 and 5 it will be appreciated by those skilled in the art that the keep smaller value selector circuit 36 is provided in order to eliminate false motion detection at the occurrence of a static vertical transition.

While FIGS. 4 and 5 have graphed level transitions at a field/frame display rate, a horizontal scan display rate is illustrated in FIG. 6. Therein, graph A represents a scan line having a level transition occurring about midway through the duration of the scan line period. Graph B depicts the same transition in the previous field, showing a spatial displacement. Since the difference between adjacent scan lines B and C of the previous field is minuscule in this example, graph B represents signals B and C. The resultant subtraction process shows for D and E a positive pulse followed by a negative pulse. The sign of the negative pulse is inverted at H, and the output G is two positive pulses indicating the intervals during which the subtracters 22 and 26 put out values other than zero.

Since it has been demonstrated that the detector 10 effectively detects motion in the vertical domain (FIG. 5) and motion in the horizontal domain (FIG. 6), and does not detect motion in the instance of a vertical transition (FIG. 4) it is evident that the detector 10 will detect diagonal motions which have vector motion components present in both the horizontal and vertical domains.

FIG. 7 illustrates a modification of the FIG. 3 field motion detector 10 to provide a structurally simplified detector 10'. Elements of the detector 10, which are the same as those described within the detector 10 bear the same reference numerals. The detector 10' employs a smaller absolute magnitude selection circuit 52, and a single full wave rectifier circuit 53, in lieu of the two rectifiers 32 and 40. The smaller absolute magnitude selection circuit 52 selects and puts out the smaller one of the low pass filtered signals D and E, and the rectifier 53 removes the sign thereof. After the signal is rectified, it is preferably passed through a threshold circuit 31a to remove the effects of noise and low level artifacts. The result is functionally identical with the result obtained from the system 10. In FIG. 7, elements 30, 38, 52 and 53 have been enclosed in a box labelled "Block A". As will be explained in conjunction with FIGS. 8 and 12, the architecture of Block A (FIG. 7) may be directly substituted for the architecture of Block B (FIG. 3).

FIG. 8 illustrates an application of the present invention within a film mode "bad" edit detector 54. The detector 54 detects the edit point illustrated in FIG. 2 and thereupon inhibits film mode of a film mode sequence detector otherwise substantially in accordance with the referenced commonly assigned U.S. Pat. No. 4,982,280.

Turning to FIG. 8, an input 56 receives an undelayed incoming video signal stream. A delay 58 provides a picture field period delay minus one half of a scan line interval. In the NTSC standards format the delay 58 is for 262 scan lines, for example. A first delayed output on a path 59 enters a one line period delay 60, so that an output from the delay 60 on a path 61 is a picture field period delay plus one half of a scan line interval relative to the input path 56. The path 61 leads to another delay 62 having the same delay period as the delay 58. An output 63 from the delay 62 enters a frame subtraction circuit 64 which subtracts the frame delayed video on the path 63 from the incoming video on the path 56. A difference value is then provided to a film motion detector 66 of the type described within the referenced commonly assigned U.S. Pat. No. 4,982,280. A film motion output path 67 from the film motion detector 66 leads into a film mode state machine 68 which is also described in the same patent and will not be further described here. An output path 69 from the film mode state machine 68 provides a selection between the undelayed video frame F0 on the input path 56 and a frame-delayed video frame F2 on the path 63. Another control line 70 indicates whether the film mode pull down ratio has been detected by the film mode state machine 68. The control line 70 passes through a switch 72 to an output 73. The output 73 is fed back into the film mode state machine and therefore provides a latch control line such that once the switch 72 is closed, the film mode state machine 68 is latched out of film mode for the balance of the video frame, as will be further explained hereinafter.

The detector 54 implements two motion detectors of the type shown in FIG. 3 wherein motion detection within the video signal is separated in time by one field. Thus, in a first motion detector a subtracter circuit 80 subtracts the signal on the path 59 from the incoming signal on the path 56 to produce a difference on a path 81. And, a second subtracter 82 of the first motion detector subtracts the signal on the path 61 from the incoming signal stream on the path 56 and puts out a difference on a path 83. The paths 81 and 83 lead to a block 88 which may be block A or block B within the circuits of FIGS. 7 or 3, respectively. An output 90 from the block 88 leads through a horizontal and vertical expander/integrator/threshold circuit 92 to a path 93.

A second motion detector includes a subtraction circuit 84 which subtracts the frame delayed signal F2 on the path 63 from the field minus one half line delayed signal on the path 59 to provide a difference on a path 85. Another subtracter 86 subtracts the frame delayed signal F2 on the path 63 from the field plus one half line delayed signal on the path 61 to produce a difference on a path 87. The paths 85 and 87 lead into a circuit 94 which may be block A or block B from FIGS. 7 or 3, respectively. An output path 96 from the circuit 94 leads into a horizontal and vertical integrator/expander/threshold circuit 98 which produces an output on a path 99.

The circuits 92 and 98 function spatially to monitor an area of the picture display of defined size and monitor the amount of motion occurring within the defined area. If the amount of motion is greater than a predefined threshold, the area is then determined to be in motion. The size of the area and the threshold are chosen to be sufficiently large that noise, tape dropouts, etc., do not adversely affect motion detection. The motion detecting area moves throughout the picture display looking for areas of considerable motion. FIG. 9 illustrates an area of motion detection within the picture frame. If sufficient motion is detected within this area, the area is said to be in motion.

In practice, the circuits 92 and 98 implement a horizontal integration, followed by a threshold function, followed by a vertical integration, followed by a second threshold function: i.e., a series of operations performed in tandem, which means that certain angles are formed with reference to others The size criteria are not the same for the vertical and horizontal domains, or for the diagonal domain. Rather, the size criteria are biased so that one or two line phenomena, such as noise spikes, dropouts etc, are not integrated very much. These functions are described in the referenced commonly assigned U.S. Pat. No. 4,982,280 and the interested reader is referred to the discussion therein for further details.

What is important in the context of the FIG. 8 detector 54 is the processing performed upon the motion signals on the paths 93 and 99, and that processing enables determination of whether the film mode detection circuitry 68 is properly working or not, i.e., whether a bad edit as shown in FIG. 2 has occurred, or not. The paths 93 and 99 lead through a series of single pole, double throw switches 100, 102, and 104 which essentially combine logical conditions relating to F0/F2 selection, film mode selection, and frame motion with the field motion signals on the paths 93 and 99. The resultant signal on a path 106 leads into a vertical hold and shaper circuit 108. The vertical hold and shaper circuit 108 receives vertical synchronization information on a path 109, and puts out a bad edit control signal on a path 110 which controls the switch 72 and holds the non-film video mode for the balance of the interlaced picture field of the incoming video signal stream.

The F0/F2 control signal on the path 69 controls actuation of the first tandem switch 100. The film mode yes/no control signal on the path 73 controls actuation of the switch 102, and the frame motion signal on the path 67 controls actuation of the switch 104. Operation of the switch 100 selects between the motion signal on the paths 93 and 99. When the switches 102 and 104 are actuated and improper field motion, i.e. motion between the direct field F1 and the currently displayed interpolated field (F0 and F2), is detected the vertical hold and shaper circuit 108 immediately puts out a bad edit signal on the path 110 and forces the film mode state machine 68 into non-film video mode until a new film sequence is detected. The bad edit detector 54 thus eliminates a problem arising with bad edits otherwise remaining in the film mode sequence detection system described in the referenced commonly assigned U.S. Pat. No. 4,982,280. In that system, a bad film edit resulted in a flash or distortion pattern which lasted for e.g. five fields, before the prior film mode detector detected the loss of the film sequence pattern and reverted to non-film mode. With the present detector 54 controlling the film mode detector, that undesirable delay in switchover is eliminated; and, upon detection of a bad edit the film mode is immediately aborted.

FIG. 10 shows the operation of FIG. 8 on a field by field basis for the bad edit of FIG. 2. On signal 93 we find the field motion between the currently displayed direct field F1 and the current input F0. On line 99 we have the field motion of the currently displayed direct field F1 and the frame delayed signal F2. Switch 100 outputs the field motion difference between the currently displayed direct field F1 and the currently displayed interpolated field F0 or F2. During a proper film sequence there should never be a difference. The second switch 102 allows the bad edit circuitry to have effect only when in the film mode. The third switch 104 determines that a bad edit only can occur when there is frame motion and field motion. Therefore, the output Y is only true when there is detected field motion between the currently displayed direct field and the currently displayed interpolated field and the video subject matter is from film and there is frame motion. This is shown on line 106.

Once a bad edit has been detected the film Y/N signal 73 is forced off (i.e. video mode) and will remain off until a new film sequence has been detected. FIG. 11 shows a logic circuit equivalent of the FIG. 8 switches 100, 102, and 104. Therein, AND gates 120, 122 and 124, and inverter 126 provide the same logical functions as are provided by the switches 100, 102, and 104.

By way of further explanation, in order to understand how early detection works, one must have an understanding of the failings of frame motion film detection. For a given film sequence like the one illustrated in FIG. 1, the signal on line 67 would look like:

| Film sequence: | A | A | A | B | B | C | C | C | D | D | E | E | F | F... |
|---|---|---|---|---|---|---|---|---|---|---|---|---|---|---|
| Signal 67: | 0 | 1 | 1 | 1 | 0 | 1 | 1 | 1 | 0 | 1 | 1 | 1 | 1... |

This sequence is the one that the state machine 68 of FIG. 8 is looking for in order to acquire film mode. Once film mode has been acquired, in order to stay in film mode for non-moving subject material, the signal 67 sequence can be, for example, as follows:

| Film sequence: | A | A | A | B | B | C | C | C | C | C | E | E | F | F... |
|---|---|---|---|---|---|---|---|---|---|---|---|---|---|---|
| Signal 67: | 0 | 1 | 1 | 1 | 1 | 0 | 0 | 0 | 1 | 1 | 0 | 1 | 1 | 1... |

As illustrated by this example, once the film mode detector 68 is in the film mode, the only data that is known for sure are the zeros which will occur five fields apart, as pointed out by the markers. With this constraint in mind, if an electronic edit occurs as in the FIG. 2 example, the standard film mode detector 68 will not detect the edit until it has already been displayed, as follows:

| F0: | A | A | A | B | P | P | P | Q | R | R | R |
|---|---|---|---|---|---|---|---|---|---|---|---|

-continued

| | | | | | | | | | | | |
|---|---|---|---|---|---|---|---|---|---|---|---|
| F1: | A | A | A | B | P | P | P | Q | Q | R | R | R |
| F2: | | A | A | A | B | P | P | P | Q | Q | R | R | R |
| F2- F0: | | 0 | 1 | 1 | 1 | 0 | 1 | 1 | 1 | 1 | 0 | 1 | 1 |

The leftmost marker above marks where the edit occurred, and the rightmost marker marks when the edit is detected by the film mode state machine 68. Continuing with the example:

| Film Y/N: | Y | Y | Y | Y | Y | Y | N | N | N | Y | Y | Y |
|---|---|---|---|---|---|---|---|---|---|---|---|---|
| F2/F0: | 0 | 2 | 0 | 2 | 0 | 0 | . | . | . | | | |
| After LD: | A | A | P | P | P | P | Q | Q | R | R | R | |
| | A | A | B | B | P | Q | Q | Q | R | R | R | |

The markers immediately above show three fields which are improperly formed due to failure to detect the bad edit. Because the bad edit detector/corrector of FIG. 8 checks to see if there is field motion between the direct field F1 and the currently displayed interpolated field F0 or F2, whenever the conditions for a bad edit are present, the bad edits detector/corrector 54 immediately switches to the video mode, thereby immediately correcting for the detected condition.

The defining conditions for a bad edit are: 1) improper field motion which is defined as the occurrence of motion between the direct field F1 and the currently displayed interpolated field F0 or F2 (this is shown at Point Z in FIG. 8); 2) the state machine 68 is presently in film mode; and, 3) frame motion is detected A bad edit thus occurs when there is frame motion and improper field motion when the state machine 68 is in film mode.

The bad edits detector/corrector 54 of FIG. 8 corrects the FIG. 2 bad edit example, as follows:

| | | | | | | | | | | | | | |
|---|---|---|---|---|---|---|---|---|---|---|---|---|---|
| F0 | A | A | A | B | P | P | P | Q | Q | R | R | R | |
| F1 | | A | A | A | B | P | P | P | Q | Q | R | R | R |
| F2 | | | A | A | A | B | P | P | P | Q | Q | R | R | R |
| Signal 67 | | | 0 | 1 | 1 | 1 | 0 | 1 | 1 | 1 | 1 | 0 | 1 | 1 | ... |
| Signal 69 F0/F2 | | | 0 | 2 | 0 | 0 | 2 | 2 | 0 | 2 | 0 | 2 | 2 | 0 | ... |
| Signal 70 Film Y/N | | | Y | Y | Y | N | N | N | N | N | N | Y | Y | Y | ... |
| Signal 99 \|A-B\| | | | 0 | 0 | 1 | 1 | 0 | 0 | 1 | 0 | 1 | 0 | 0 | . |
| Signal 93 \|B-C\| | | | 0 | 1 | 1 | 0 | 0 | 1 | 0 | 1 | 0 | 0 | 1 | . |
| Signal 106 Point Z | | | 0 | 0 | 1 | 0 | 0 | 0 | 0 | 0 | 0 | . | . | |
| Signal 73 Film Y/N | | | Y | Y | N | N | N | N | N | N | N | Y | Y | Y |
| After Line Doubling | | | A | A | B | P | P | P | Q | Q | R | R | R | |
| | | | A | A | B | P | P | P | Q | Q | R | R | R | |

It is now evident that the bad edit has been properly detected in time to correct any artifacts that may otherwise be generated, such as the sawtooth effect.

FIG. 12 illustrates a bad edits detector 54' which is similar to the FIG. 8 circuit, except that the circuit 54' is simplified and for that reason is preferred. FIG. 12 makes use of the fact that the signal 99 |A-B| of FIG. 8 is just signal 93 |B-C| which has been delayed by one field delay period. The FIG. 12 approach 54' offers a slight improvement over the FIG. 8 implementation because when an error occurs in the |B-C or |A-B| signals of FIG. 8 halfway through the picture, some slight artifacts may be seen just before correction. In this implementation, a single bit one field delay 112 is used to replace the second motion detector circuitry comprising elements 84, 86, 94 and 98. The delay 12 may be implemented in the digital domain with a simple register circuit which is clocked at the appropriate time.

FIG. 13 shows that With the FIG. 12 implementation, while no improvement occurs if the edit occurs in field 1, if the edit occurs during field 2 the entire field is corrected, not just from the point of detection as in the FIG. 8 configuration. The field delay circuit 112 delays signal at point X by one field, at which point it is gated with the F0/F2 signal on the path 69 which achieves the same logical result as was obtained with more complicated circuitry of the detector 54 shown in FIG. 8.

To those skilled in the art to which the present invention pertains many widely differing embodiments will be suggested by the foregoing without departing from the spirit and scope of the present invention. The descriptions and disclosures herein are intended solely for purposes of illustration and should not be construed as limiting the scope of the present invention which is more particularly pointed out by the following claims.

What is claimed is:

1. A motion detector for generating a field motion detection signal from information contained in fields of opposite parity of a two-to-one interlaced format video signal comprising:

input means for receiving the video signal from a source, first delay means for delaying the video signal at the input by one field period less one half of one scanning line period and for providing a first delayed output, second delay means for delaying the video signal at the input by one field period plus one half of one scanning line period and for providing a second delayed output, first subtraction means for subtracting the first delayed output from the video signal to provide a first difference, second subtraction means for subtracting the second delayed output from the video signal to provide a second difference, comparison circuitry means for comparing the magnitude of the first difference with the magnitude of the second difference, and selection means responsive to the comparison circuitry means for selecting as a motion reference the one of the first difference and of the second difference having a lesser absolute magnitude and for putting out a function of the motion reference as the field motion detection signal.

2. The motion detector set forth in claim 1 wherein the video signal comprises a luminance component separated from a quadrature modulated subcarrier color composite television picture signal.

3. The motion detector set forth in claim 1 wherein the video signal comprises a monochrome television picture signal.

4. The motion detector set forth in claim 1 further comprising first low pass filter means in a path between the first subtraction means and the comparison circuitry means, and further comprising second low pass filter means in a path between the second subtraction means and the comparison circuitry means.

5. The motion detector set forth in claim 1 further comprising first sign removal circuit means in a path between the first subtraction means and the comparison circuitry means, and further comprising second sign removal circuit means in a path between the second subtraction means and the comparison circuitry means.

6. The motion detector set forth in claim 1 further comprising first threshold circuit means in a path between the first subtraction means and the comparison circuitry means, and further comprising second threshold circuit means in a path between the second subtraction means and the comparison circuitry means.

7. The motion detector set forth in claim 1 further comprising first low pass filter means, first sign removal circuit means and first threshold circuit means in a path between the first subtraction means and the comparison circuitry means, and further comprising second low pass filter means, second sign removal circuit means and second threshold circuit means in a path between the second subtraction means and the comparison circuitry means.

8. The motion detector set forth in claim 1 further comprising threshold circuit means connected downstream of said comparison circuitry means whereby said field motion detection signal is subjected to a predetermined minimum threshold value below which the detection signal is inhibited.

9. The motion detector set forth in claim 1 further comprising sign removal circuit means downstream of the comparison circuitry means, thereby rendering the motion detection signal as an absolute value.

10. The motion detector set forth in claim 1 further comprising third delay means connected to delay the second delayed output by one field period minus one half of one scanning line period and for putting out a frame delayed output, and further comprising third subtraction circuit means for subtracting from the video signal the frame delayed output of the third delay means so as to generate a frame motion detection signal.

11. The motion detector set forth in claim 1 further comprising logic circuit means for combining said field motion detection signal and said frame motion detection signal to provide a composite motion detection signal for signalling detection of motion occurring within a particular field of the frame.

12. A pattern interruption detector for controlling operation of a motion sequence pattern detector for detecting a periodic pattern of motion sequences within a video temporal signal stream from a source and including a frame motion detector means for detecting the presence of motion by comparing spatial picture data to similarly located, frame delayed successive spatial picture data within the video temporal signal and for putting out a frame motion detection signal for each comparison of said data and first logic circuit means responsive to a sequence of frame motion detection signals for detecting said periodic pattern of motion sequences within a video temporal signal stream and for putting out a pattern detection control signal, the pattern interruption detector comprising:

input means for receiving the temporal video signal stream from the source, first delay means for delaying the video signal at the input by one field period less one half of one scanning line period and for providing a first delayed output, second delay means for delaying the video signal at the input by one field period plus one half of one scanning line period and for providing a second delayed output, first subtraction means for subtracting the first delayed output from the video signal to provide a first difference, second subtraction means for subtracting the second delayed output from the video signal to provide a second difference, first comparison circuit means for comparing the first difference with the second difference and for putting out a selected one thereof having a lesser absolute magnitude as a field motion detection signal, second logic circuit means connected to said frame motion detector means, to said first comparison circuit means and to said first logic means for detecting an interruption in the periodic pattern and for thereupon generating an inhibition control signal for inhibiting said first logic circuit means.

13. The pattern interruption detector set forth in claim 12 further comprising spatial motion detection means in a path between the comparison circuit means and the second logic circuit means for generating a spatial motion detection zone surrounding a detected object in motion in the temporal video signal stream.

14. The pattern interruption detector set forth in claim 12 wherein the second logic circuit means includes vertical interval holding circuit means for holding the inhibition control signal for the duration of a present field interval, and further comprising field delay means for delaying the inhibition control signal for a period of one field interval.

15. The pattern interruption detector set forth in claim 12 wherein said frame motion detector means includes said first delay means and said second delay means and further comprises third delay means for delaying the video signal at the second delayed output by one field period less one half of one scanning line period thereby providing a frame delayed output, and frame subtracter means for subtracting the frame delayed output from the temporal video signal stream.

16. The pattern interruption detector set forth in claim 12 further comprising:

third delay means for delaying the video signal at the second delayed output by one field period less one half of one scanning line period thereby for providing a frame delayed output, third subtracter means for subtracting the frame delayed output from the first delayed video output to provide a third difference, fourth subtracter means for subtracting the frame delayed output from the second delayed video output to provide a fourth difference, second comparison circuit means for comparing the fourth difference with the third difference and for putting out a selected one thereof having a lesser absolute magnitude as a second field motion detection signal to the second logic circuit means, the second logic circuit means including selection means for selecting between the field motion detection signal put out by the first comparison circuit means and the second field motion detection signal put out by the second comparison circuit means.

17. The pattern interruption detector set forth in claim 12 wherein the second logic circuit means is controlled by the pattern detection control signal.

18. The pattern interruption detector set forth in claim 16 wherein the selection means within the second logic circuit means is controlled by the pattern detection control signal.

19. The pattern interruption detector set forth in claim 12 wherein the periodic pattern of motion sequences comprises a three-to-two pull down ratio of 24 frames per second films which sequences have been transferred to the video temporal signal stream within television standards operating at approximately 60 fields per second.

20. The pattern interruption detector set forth in claim 12 wherein the periodic pattern of motion sequences comprises one film frame per one television frame and wherein said sequences have been transferred to the video temporal signal stream within television standards operating at 25 frames per second.

21. The pattern interruption detector set forth in claim 12 wherein the interruption in the periodic pattern detected by the second logic circuit means is caused by editing in the video domain of film sequence material transferred to video and wherein the editing fails to preserve the original film sequence.

* * * * *